Feb. 15, 1938.                T. W. PAUL                2,108,346
                             TRACTOR WHEEL
                          Filed March 23, 1936
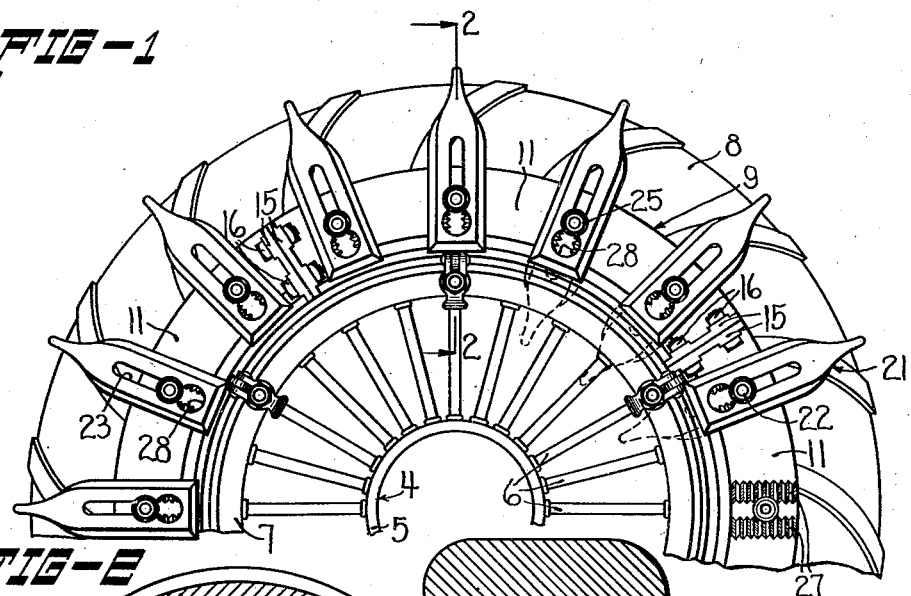
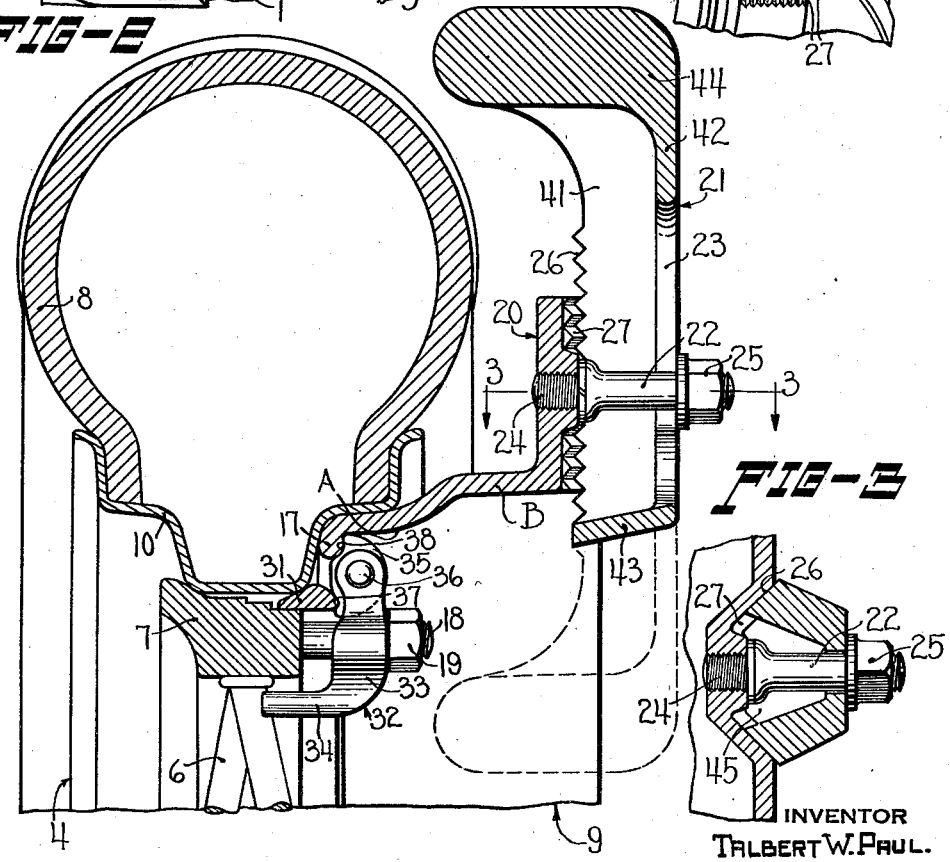
INVENTOR
TALBERT W. PAUL.
BY
ATTORNEY Patented Feb. 15, 1938

2,108,346

UNITED STATES PATENT OFFICE 2,108,346

TRACTOR WHEEL

Talbert W. Paul, Moline, Ill., assignor to John Deere Tractor Company, Waterloo, Iowa, a corporation of Iowa Application March 23, 1936, Serial No. 70,260

8 Claims. (Cl. 301—50)

The present invention relates to rubber tired traction wheels for tractors and more particularly has to do with means for increasing the traction of such wheels. Specifically, the present invention contemplates the application of additional weight to said wheels and the provision of ground engaging lugs or grousers on such wheels.

Within the last few years the use of rubber tired wheels on tractors has become quite general, in view of the fact that such tires are well adapted for many kinds of work and are easier riding than are steel tired wheels. This is especially true of pneumatic tires. However, it has been found that when such tires are to be used in connection with certain kinds of work it is desirable, and sometimes necessary, to provide some means for increasing the amount of traction, as by the provision of additional weight on the traction wheels so that better traction may be obtained. Also, in some cases, it is necessary to provide either chains or lugs to operate in conjunction with the rubber tires to obtain the desired amount of traction.

With the above in view it is the principal object of the present invention to provide improved means, not only for the mounting of additional weight on such traction wheels, but also for supporting ground engaging lugs or grousers on the rubber tired traction wheels.

Another object of the present invention is the provision of weight adding means which is arranged to serve also as a support for ground engaging lug means.

A further object of the invention is to provide supporting means for the lugs so that they may be disposed on the wheels either in operating position or in non-operating position whereby the weight of the lugs is utilized at all times, regardless of their position on the wheels.

A still further object of the invention is to provide improved means for supporting the lugs on the wheel whereby such means acts not only as means for attaching the lugs but also as a weight member to add weight to the wheel.

A still further object of the invention is to provide an improved traction lug particularly adapted for mounting on a rubber tired wheel.

A still further object of the invention is to provide a common fastening means for securing the retaining ring for the demountable rim and a lug supporting weight member in position on the wheel.

A still further object of the invention is to provide an improved means for attaching traction lugs to the weight member, which means is so constructed as to effect a wedging action between the traction lug and the weight member to provide a more rigid connection between these members.

Other objects and advantageous features will be apparent from the following description of the preferred embodiment of my invention as illustrated in the accompanying drawing, in which:

Figure 1 is a side elevational view of a pneumatic tired wheel equipped with my improvements;

Figure 2 is a cross sectional view taken substantially on the plane of the line 2—2 of Figure 1; and Figure 3 is a detail sectional view taken substantially on the plane of the line 3—3 of Figure 2 and showing the means for securing the traction lug to the weight member.

While in the drawing I have illustrated my invention as applied to a wheel equipped with a pneumatic tire, it is to be understood that the invention is not to be so limited, as it may readily be used in connection with wheels equipped with rubber tires other than those of the pneumatic type, or with any other type of tire. Referring now to the drawing, the traction wheel illustrated is of conventional type and is indicated as a whole by the numeral 4. It comprises a hub 5 from which radiates a plurality of spokes 6, the outer ends of which are secured in any suitable manner to a felloe 7 on which is mounted in the usual way a demountable rim 10 which carries a pneumatic tire 8. The demountable rim 10 is securely held on felloe 7 by a laterally tapered retaining ring 31 which is inserted edgewise between felloe 7 and demountable rim 10 and is locked therein by a clamping device 32 provided on a stud bolt 18 which projects outwardly from felloe 7. The clamping device 32 is secured to the felloe 7 by a nut 19 threaded on the outer end of bolt 18.

Detachably secured to the wheel in any suitable manner as hereinafter described is a weight member indicated in its entirety by the reference numeral 9. This weight member is generally bell-shaped, as shown in section in Figure 2, and while it may be in the form of a single integral casting, it is preferably sectionalized in four sections corresponding to those indicated by numeral 11 in Figure 1 in order to simplify the casting thereof and to facilitate placing the weight member in position on the wheel. While in the preferred construction the weight member is formed in four sections, it may be formed in as many sections as desired. At their opposite ends each of said casting sections 11 is provided with outwardly extending attaching flanges 15, said flanges being bored to receive pairs of short bolts 16 by which the several parts of sections making up the bell-shaped weight member are adapted to be rigidly connected together as shown in Figure 1.

Each section of the bell-shaped weight member 9 includes a radially inner portion A, the radially inner margin of which is formed as a circumferential bead 17 which is disposed adjacent clamping device 32 and is held in place on felloe 7 by this clamp. The clamping device 32 includes a clamp member 33 which is journaled between its ends on stud bolt 18. The end of member 33 nearest the hub 5 is bent inwardly at 34 and the end thereof engages an adjacent spoke 6 of the wheel 4. The end of member 34 is adapted to bear upon the spoke 6 and is suitably recessed to prevent member 34 being disengaged from spoke 6 when in assembled position. In order that clamping device 32 may engage both bead 17 and retaining ring 31 and lock them in position on wheel 4, and equalizing lever 35 is pivotally mounted intermediate its ends on a pivot 36 adjacent the end away from the hub of member 33. Detents or notches 37 and 38 are formed in the inner edge of lever 35 at opposite sides of pivot 36 and are adapted to receive the adjacent edges of ring 31 and bead 17 and exert equal pressure thereon to securely hold these members in position. By this construction the several sections of the weight member 9 may be easily and quickly attached to and detached from the wheel, as will be readily understood. The section or portion A of the bell-shaped weight member may be either cylindrical or slightly tapered and is adapted to be wedged against one edge of the felloe 7, as shown in Figure 2, when the nuts 19 on the stud bolts 18 are drawn up, thereby tightly clamping the weight member section to the wheel.

Extending radially and laterally outwardly of the portion A of the bell-shaped weight member 9 is a flared portion B which extends radially beyond the edge of the rim to a point alongside of the tire and terminates in a radially outwardly extending flange 20. As shown in Figure 1, the radially outwardly extending flange 20 of each of the weight member sections 11 supports a plurality of traction lugs 21. While in the illustrated construction each of said sections is shown as provided with four lugs, it is to be understood, of course, that any desired number of such lugs may be carried by each of said sections.

Each of the lugs 21 is supported on the flange 20 by means of a stud bolt 22 which passes through a radially extending slot 23 in the lug 21 and at its inner end is threaded into a screw threaded opening 24 provided therefor in the base portion of a recess 45 formed in the outer face of flange 20, as shown in Figure 2, and a nut 25 threaded on the outer screw threaded end of the stud bolt locks the lug in position on the bolt. The lug 21 is substantially rectangular and comprises spaced parallel side flanges 41, a base member 42 and an end web 43 at one end thereof. At the opposite end of lug 21, flanges 41 converge into a tread portion 44. The inner edges of flanges 41 adjacent the slot 23 are provided with transversely extending serrations 26 that cooperate with serrations 27 formed in the laterally outer surface of the flange 20 adjacent the openings 24. By providing the radially extending slot 23 in the lug 21 the radial position of the lug relative to the wheel may be adjusted, and the several serrations 26 and 27 cooperate with each other to lock the lug positively against radial movement in any adjusted position to which it may be set relative to the flange, as will be readily understood. The walls of each recess 45 converge inwardly and the serrations 27 are formed on the outer surfaces of these walls. The edges of flanges 41 of lug 21, upon which serrations 26 are formed, are also tapered at an angle corresponding to the angle of the converging walls of recess 45 as shown in Figure 3. By reason of the tapered contacting surfaces of lug 21 and flange 20, when nut 25 is tightened against base member 42 the serrations 26 are wedged into engagement with serrations 27 and form a snug fit between lug 21 and flange 20. This provides a rigid construction wherein lug 21 is securely held on flange 20 and is supported against fore and aft thrusts caused by lug 21 coming in contact with rocks or other foreign objects in the ground over which the tractor is operated. The end of the slot 23 nearest the hub 6 is enlarged, as shown at 28, sufficiently to permit the lug to be removed without wholly removing the nut 25 from the stud bolt 22, as when it may be desired to shift the lug radially inwardly or outwardly or to reverse it from its operating position, shown in full lines in Figures 1 and 2, to its non-operating position, shown in dotted lines in said figures, as by the illustrated construction it is only necessary to loosen the nut 25 sufficiently to permit disengagement of the serrations 26 from the serrations 27 whereupon the lug may be shifted until the enlarged opening 28 in the lug comes into alinement with the nut 25 whereupon the lug may be removed and replaced on the bolt to lie in its inoperative position as indicated in dotted lines in Figure 2. While in the preferred construction illustrated in the drawing, stud bolts have been employed for securing the several lugs to the weight member which supports them, it will be understood that any type of securing means may be employed for this purpose.

When it is desired to increase the traction of the wheel 4 by additional weight alone, the sections 11 are attached to the wheel in the manner specified above. If additional weight is necessary, the lugs or grousers 21 are attached but with their earth engaging ends disposed radially inwardly as indicated in dotted lines in Figures 1 and 2. If additional traction is needed, the lugs 21 are shifted in the manner specified above to a position in which the grousers engage the ground, as indicated in full lines in Figures 1 and 2. It is to be noted that the weight member serves not only as weight adding means but also as a supporting means for the grousers, and it will also be noted that the grousers themselves serve not only as ground engaging lugs but also as weight adding means.

While I have thus shown and described above the preferred structure in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patents is:

1. The combination with a tractor wheel, of a weight member detachably connected to said wheel, a plurality of traction lugs, said weight member being provided with a plurality of recesses having converging side walls, said traction lugs having tapered sides adapted to rest in said recesses, and means carried by said weight member for supporting said traction lugs in position, said means being adjustable for optionally supporting the lugs in the operating or non-operating position.

2. The combination with a wheel having a rim, of means for adjustably mounting a plurality of traction lugs on said wheel comprising a member secured to said wheel and extending laterally outwardly adjacent the rim, said member being provided with a plurality of recesses having converging side walls, serrations formed on said side walls, stud bolts fixedly secured in said recesses, a plurality of traction lugs on said bolts, said lugs having tapered sides adapted to rest in said recesses and being provided with slots for receiving said bolts whereby said lugs are adjusted on said bolts.

3. The combination with a wheel provided with a pneumatic tire, of means for adjustably mounting a traction lug on said wheel, comprising a member secured to said wheel and including a section extending radially and laterally beyond the plane of the adjacent side of said tire, said section being provided with a recess having converging side walls, a stud bolt fixedly secured in said recess, a traction lug on said bolt, said lug having tapered sides adapted to rest in said recess and being provided with a slot longitudinally of the lug for receiving said bolt whereby said lug may be adjusted on said bolt radially of the wheel, a nut threaded on the outer end of said bolt for securing said lug in clamping engagement with said recess, and said slot having an enlarged opening at one point to provide for the removal of said lug without removing the nut on said stud bolt.

4. The combination with a rubber tired traction wheel having a demountable rim and a retaining member positioned for holding said demountable rim on said wheel, of a weight member adapted to be positioned alongside the rim and tire of the wheel, and a plurality of clamping devices for detachably securing the inner portion of said weight member and said rim retaining member in assembled position, each clamping device having an equalizing lever pivoted thereon and adapted to engage said weight member and said retaining member.

5. The combination with a rubber tired traction wheel including a wheel felloe, a demountable rim removably mounted on said wheel felloe and a retaining ring inserted therebetween, of a weight member adapted to be positioned alongside the rim and tire of the wheel, and a plurality of bolts carried by said wheel felloe adjacent the outer edge thereof, and clamping devices carried on said bolts, each clamping device having a pivoted lever adapted to engage said weight member and said retaining ring to secure said demountable rim and said weight member in assembled position.

6. The combination with a rubber tired traction wheel, of a plurality of traction lugs and means for mounting said lugs on said wheel, said means comprising a member secured at its inner portion to the wheel and extending radially and laterally outwardly to a point alongside the tire of the wheel, the radially outer portion of said member having a plurality of recesses each having inwardly converging walls, transverse serrations formed on said converging walls, converging surfaces on said lugs having serrations thereon cooperating with the serrations on the walls of said recesses, and a plurality of bolts carried by said member.

7. The combination with a rubber tired traction wheel, of a plurality of traction lugs and means for mounting said lugs on said wheel, said means comprising a member secured at its inner portion to the wheel and extending radially and laterally outwardly and terminating in a flange portion disposed substantially perpendicular to the axis of the wheel, said flange portion of said member having a plurality of recesses having inwardly converging serrated walls, converging serrated surfaces on said lugs of an angle corresponding to the angle of the converging walls of said recess, and means for holding said lugs on said wheel with said surfaces in cooperation with said converging walls, said means being adjustable for optionally holding said lugs in operative or inoperative position.

8. The combination with a wheel provided with a pneumatic tire, of means for adjustably mounting a traction lug on said wheel, comprising a member secured to said wheel and including a section extending radially and laterally beyond the plane of the adjacent side of said tire, said section being provided with a recess having converging serrated side walls, a stud bolt fixedly secured in said recess, a traction lug on said bolt, said lug having tapered serrated sides adapted to rest in said recess and being provided with a slot longitudinally of the lug for receiving said bolt whereby said lug may be adjusted on said bolt radially of the wheel.

TALBERT W. PAUL.